(12) United States Patent
Eagleton et al.

(10) Patent No.: US 6,725,137 B2
(45) Date of Patent: Apr. 20, 2004

(54) METHOD AND APPARATUS USING HISTORICAL DATA TO ASSOCIATE DEFERRAL PROCEDURES AND FAULT MODELS

(75) Inventors: Stephen P. Eagleton, Chandler, AZ (US); Timothy J. Felke, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 23 days.

(21) Appl. No.: 10/116,182

(22) Filed: Apr. 3, 2002

(65) Prior Publication Data
US 2003/0191563 A1 Oct. 9, 2003

(51) Int. Cl.$^7$ ............................................... G06F 19/00
(52) U.S. Cl. ........................ 701/29; 701/35; 701/3; 244/75 R
(58) Field of Search .................... 701/29, 35, 3; 244/75 R

(56) References Cited

U.S. PATENT DOCUMENTS

| | | | | |
|---|---|---|---|---|
| 4,815,014 A | * | 3/1989 | Lipner et al. | 702/184 |
| 5,315,502 A | * | 5/1994 | Koyama et al. | 700/79 |
| 5,634,039 A | * | 5/1997 | Simon et al. | 703/18 |
| 6,122,575 A | * | 9/2000 | Schmidt et al. | 701/29 |
| 6,125,312 A | | 9/2000 | Nguyen et al. | |
| 6,243,628 B1 | * | 6/2001 | Bliley et al. | 701/29 |
| 6,253,147 B1 | | 6/2001 | Greenstein | |
| 6,574,537 B2 | * | 6/2003 | Kipersztok et al. | 701/29 |
| 2002/0138184 A1 | * | 9/2002 | Kipersztok et al. | 701/29 |
| 2002/0138185 A1 | * | 9/2002 | Trsar et al. | 701/33 |

FOREIGN PATENT DOCUMENTS

| | | |
|---|---|---|
| EP | 1072991 A2 | 1/2001 |
| EP | 1079204 A1 | 2/2001 |
| EP | 1106504 A | 6/2001 |
| GB | 2312518 A | 10/1997 |
| WO | WO 0131411 A | 5/2001 |
| WO | WO 0131450 A | 5/2001 |

* cited by examiner

Primary Examiner—Michael J. Zanelli
Assistant Examiner—Eric M Gibson

(57) ABSTRACT

A method of associating deferral procedures to a fault model for complex systems based on historical data, the method including the steps of: analyzing historical data for deferral information to identify deferral procedures; associating each of the deferral procedures with a corresponding one or more standard repairs; linking each of the standard repairs with a fault code; and associating each of the deferral procedures with one or more of the fault codes that were linked, respectively, with the one or more standard repairs to thereby provide a set of associations between deferral procedures and fault codes. The method may be implemented in a software program and the program may advantageously be employed in an aircraft maintenance and operations support system for automatically associating deferral procedures with an aircraft fault model based on historical data.

20 Claims, 3 Drawing Sheets

LOG PAGE NORMALIZATION RELATIONSHIPS

|  | LOG PAGE NUMBER | AIRCRAFT NUMBER | DEFERRAL NUMBER |
|---|---|---|---|
| REPAIR 1 | 123 | N777HZ | DEFERRAL 1 |
| REPAIR 1 | 124 | N777HZ | DEFERRAL 1 |
| REPAIR 1 | 125 | N777HZ | DEFERRAL 2 |
| REPAIR 2 | 126 | N777HZ | DEFERRAL 2 |

TABLE 1: NORMALIZED LOG BOOK DATA

LOG PAGE REPAIR & DEFERRAL RELATIONSHIPS

METHOD AND APPARATUS USING HISTORICAL DATA TO ASSOCIATE DEFERRAL PROCEDURES AND FAULT MODELS

FIELD OF THE INVENTION

This invention relates to systems for maintenance of complex systems and more specifically methods and apparatus for associating fault models and deferral procedures using historical data related to such systems.

BACKGROUND OF THE INVENTION

Complex systems comprising tens or hundreds of inter-related and inter-operating systems and subsystems, many which may be complex in there own right, present unique maintenance and service challenges. Examples of such complex systems include factories, major buildings, ocean-going vessels, power generation plants, and aircraft to name a few. Complex systems and the inter-related and inter-operational nature of the systems and subsystems thereof often require equally complex and disciplined maintenance and service programs. These programs usually include documentation or records of observed or indicated irregularities or discrepancies and actions taken or services performed pursuant to resolution or prevention of such irregularities and discrepancies. This documentation is usually filled out, completed, or recorded by service and maintenance personnel. Expert systems and tools that can standardize service and maintenance diagnoses, procedures, cost estimates and so on are highly desirable for the time savings and precision they can offer to an overall maintenance and operational support program.

In the aircraft industry fault codes have more recently come to be used to provide a mechanism to summarize the set of symptoms or syndrome that is reported for each distinct aircraft fault condition. A fault code typically corresponds to a fault condition in a single system on the aircraft and can be used as the basis of fault isolation, material planning and deferral/criticality analysis. Fault Codes are a critical element of a "Fault Model" for an aircraft that can be used to support an automated diagnostic and maintenance support system. Deferral Procedures for an aircraft, for example, identify the set of fault conditions for which that aircraft can still be safely operated. These procedures are typically recorded in the aircraft "Minimum Equipment List" (MEL) which is supplied by or derived from a list supplied by the aircraft manufacturer.

Honeywell International Inc. builds an automated expert system called "AMOSS" (Aircraft Maintenance and Operations Support System) that uses fault codes as a standard element in structuring the maintenance activities for an airline and aircraft within that airline. This system also assists airline personnel in the determination of which Deferral Procedures are appropriate for a given fault condition. Airlines and other suppliers also build similar systems with some of this functionality. In order to provide this functionality, it is critical that the system records a linkage or association between system fault conditions, as represented through Fault Codes, and the Deferral Procedures that are relevant. Historically this linkage could only be derived through manual generation of the data for this relationship. This is a very time consuming and error prone activity that adds complexity to the maintenance and service procedures, increases costs, and reduces the precision of planning and cost analysis activities. Clearly a need exists for methods and apparatus for associating deferral procedures and standard fault codes based on historical data.

SUMMARY OF THE INVENTION

The instant invention in overview is a method of associating deferral procedures to a fault model for complex systems based on historical data. The method includes: analyzing the historical data for deferral information to identify a plurality of deferral procedures; associating each of the plurality of deferral procedures with a corresponding one or more of a plurality of standard repairs; linking each of the plurality of standard repairs with a fault code; and associating each of the plurality of deferral procedures with one or more of the fault codes that were linked, respectively, with the one or more of the plurality of standard repairs to thereby provide a set of associations between the plurality of deferral procedures and a plurality of fault codes.

Preferably, analyzing the historical data for deferral information to identify the plurality of deferral procedures further includes assigning a deferral procedure from a deferral procedure list to each occurrence of deferral information. Also a reference to the historical data may be maintained with each of the plurality of deferral procedures and each of the plurality of standard repairs. The process of associating the plurality of deferral procedures preferably further includes creating relationships between the plurality of deferral procedures and the plurality of standard repairs utilizing the historical data that is common between a deferral procedure and a standard repair. The act of linking the plurality of standard repairs likely includes selecting the fault code from a standard fault code list. The method may also include reviewing and accepting a portion of the set of associations. In a preferred form this method is used to associate deferral procedures to a fault model for an aircraft.

One aspect of the invention is a software program comprising software instructions that are arranged to run on a processor to process information derived from historical data in order to facilitate associating deferral procedures to a fault model for complex systems based on the historical data. The software program when installed and operating on a processor results in the processor performing the method. Another aspect of the invention is a computer based aircraft maintenance and operations support system for automatically associating deferral procedures with an aircraft fault model based on historical data when the computer is executing the software program to perform the above reviewed method.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview form the present disclosure concerns and relates to systems for maintenance of complex systems and more specifically methods and apparatus for associating deferral procedures with fault codes within a fault model using historical data related to such systems. More particularly various inventive concepts and principles embodied in methods and apparatus for the systematic development of such associations are discussed. The complex systems of particular interest are those associated with aircraft, however the concepts and principles discussed herein will be equally applicable to other complex systems such as those noted earlier.

As further discussed below various inventive principles and combinations thereof are advantageously employed to essentially mine or produce standardized deferral data from historical data, such as logbook pages, and incorporate resulting associations into fault models, thus alleviating various problems, such as imprecise service and maintenance actions and descriptions and the excess costs associated with known systems while still facilitating quality service and maintenance activities and more precise labor, time, and cost estimates that will result from the more systematic forecasts of requisite deferral procedures and actions that are enabled by appropriate and consistent relationships between deferral procedures and fault codes.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
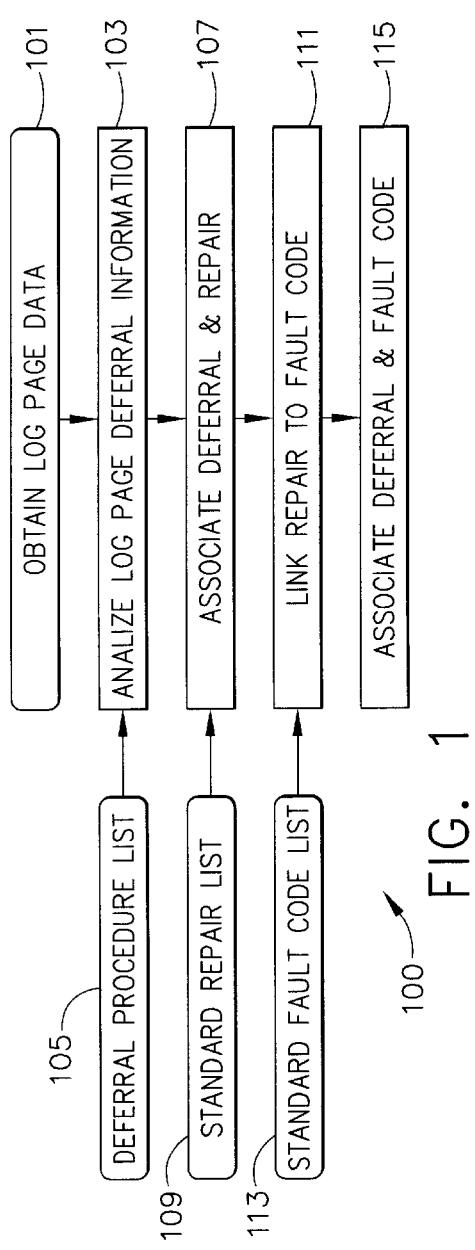
FIG. 1 depicts, in a simplified and exemplary form, a flow chart of a method of associating deferral procedures and fault codes according to the present invention.

Referring to FIG. 1 a simplified and exemplary flow chart of a method 100 of associating deferral procedures with fault codes or to a fault model for complex systems based on historical data is depicted. The method begins at 101 where historical data, specifically log book pages from aircraft maintenance records or similar data from maintenance and service records for other complex systems is obtained. This historical data or logbook pages will be reviewed, analyzed, and parsed or broken down into relevant constituent elements that are likely system specific and then normalized to standardized texts or names for various elements. This will be discussed below in further detail for aircraft historical date with reference to FIG. 2.

Given this historical data step 103 shows analyzing the historical data or relevant portion thereof, specifically deferral information to identify a plurality of deferral procedures and step 105 shows a reference to a deferral procedure list for standardized deferrals, such as Deferral 1, that are preferably assigned to each of the unique deferral procedures or instances of unique deferral information identified at step 103. This deferral procedure list comes from a minimum equipment list (MEL) that is derived from the OEM "Master Minimum Equipment List" in the aircraft industry. Preferably a reference or one or more references to the historical data is maintained for each of the plurality of deferral procedures. The log pages or corrective actions portions are also analyzed to group one or more corrective actions where the grouping function places similar corrective actions derived from the historical data in the same group or repair. The grouping activity can be performed using known techniques utilizing the Maintenance Manual Table of Contents (MM TOC) section titles as Standard Repairs and a combination of ATA Hierarchy nodes and MM TOC section titles for Standard Observations. Log page discrepancies and corrective actions are then mapped to Standard Observations and Standard Repairs respectively. Optionally, the results of this process are presented to a subject matter expert or engineer of ordinary skill for confirmation of the derived relationships. To enhance the quality of Standard Observations (e.g. AIR CONDITIONING), subject matter experts may be used to add Position, Symptom and Fault Condition information. Position information may be placed as a prefix to the Standard Observation (e.g. LEFT, RIGHT, Etc). Symptom information may be used to further describe the failure mode (e.g. INOP, ILLUMINATED, Etc). Fault Conditions describe the aircraft operational mode at the time of failure (e.g. IN FLIGHT, ON GROUND, Etc). A fully normalized Standard Observation could look as follows: LEFT AIR CONDITIONING INOP IN FLIGHT.

Step 109 refers to a standard repair list that reflects assigning a standard repair such as REPAIR 1 to each of the plurality of repairs or groups of corrective actions so derived. The standard repair list comes from Aircraft Maintenance Manual (AMM) in the aircraft industry. One approach is using the table of contents (TOC) as or to construct an index that is then used for the list of repairs. Also preferably for each instance where a corrective action is grouped with a repair a reference to the historical information or data is maintained. Thus each of the plurality of repairs will have one or more references to the historical data maintained therewith. These references to historical data can be a log page number or other standard reference to a maintenance record that includes or was used to derive the historical data.

Step 107 indicates associating or linking a plurality of deferral procedures with a plurality of the standardized repairs. This amounts to creating relationships between the plurality of deferral procedures and the plurality of standard repairs utilizing the historical data that is common between a given deferral procedure and a given standard repair. In the preferred embodiment this uses the references to the historical data that have been maintained for each of the deferral procedures and each of the standard repairs. The discussion below referencing FIGS. 3, 4, and 5 will review this in further detail. Step 111 depicts linking each of the plurality of standard repairs with a fault code, preferably a standard fault code from the fault code list referenced in 113. The fault code list and standard repair list are part of the typical fault model for newer aircraft, for example. For older (designed prior to the mid '80s) aircraft and other complex systems co-pending patent application titled: METHOD AND APPARATUS FOR DEVELOPING FAULT CODES FOR COMPLEX SYSTEMS BASED ON HISTORICAL DATA by Felke et al. bearing Ser. No. 10/184,594 and assigned to the same assignee as here discusses an approach for developing such standardized information.

Step 115 depicts associating each of the plurality of deferral procedures with one or more of the fault codes that were linked, respectively, with the one or more of the plurality of standard repairs, thereby providing a set of associations between the plurality of deferral procedures and a plurality of fault codes. This is demonstrated in FIG. 7. Not shown in FIG. 1 but never-the-less preferred is one additional step where the associations and other links formed by the method 100 are made available for review and acceptance or rejection of each can be chosen. The links and associations that are accepted become part of the final fault code model in a preferred embodiment of a fault code model for an aircraft.

One preferred embodiment or way of performing the method 100 is a software program comprising software instructions that are arranged to run on a processor to process information derived from the historical data in order to facilitate associating deferral procedures to a fault model for complex systems based. This software program when installed and operating on a processor, having access to any requisite database, will result in the processor performing the method 100. This software program will preferably enable an aircraft maintenance and operations support system for automatically associating deferral procedures with an aircraft fault model based on historical data. The system includes a user interface, such as keyboard and monitor and the like and a computer having memory for storing software instructions and the historical data or databases and a processor for executing these software instructions to process information derived from the historical data in order to facilitate associating the deferral procedures to the aircraft fault model based on the historical data. The software program essentially results in the computer executing the method 100.

Figure 2:
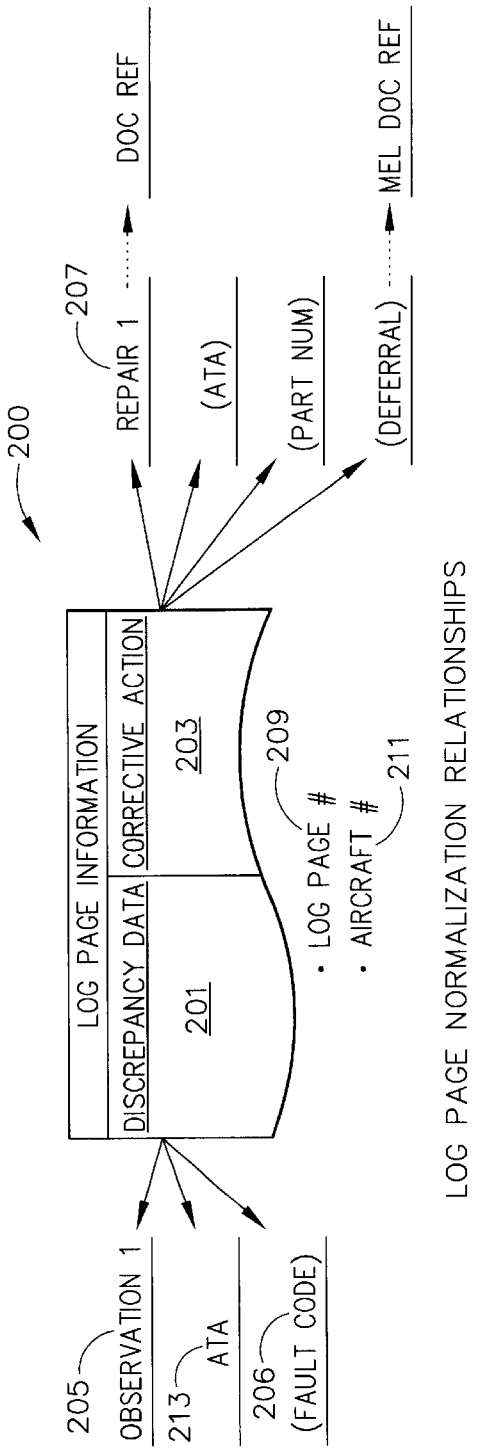
FIG. 2 depicts, in a simplified and representative form, a log page exemplifying an occurrence of historical data.

FIG. 2 depicts, in a simplified and representative form, a logbook page 200 exemplifying an occurrence of historical data in the aircraft industry. Logbooks break the information into discrepancy 201 and corrective action 203. Discrepancies are best described as human descriptions of malfunctions or irregularities (e.g. F/O ELEC TRIM SW ON YOKE INOP FOR NOSE UP TRIM, WORKED OK FOR NOSE DOWN TRIM. CAPT TRIM WORKED BOTH DIRECTIONS OK.). The principles and concepts discussed herein will allow a discrepancy to be normalized by a user of these principles and concepts and turned into one to many standard observations, for example OBSERVATION 1 205, (e.g. 1) F/O STAB TRIM YOKE SWITCH NOSE UP INOP; 2) CAPT STAB TRIM YOKE SWITCH NORMAL), and FAULT CODE 206 (e.g. F/O STAB TRIM YOKE SWITCH NOSE UP INOP INFLIGHT, CAPT STAB TRIM YOKE SWITCH NORMAL). Likewise, a corrective action will be normalized to create a repair for example REPAIR 1 207, such as replace bleed air valve. Each repair also includes a reference (DOC REF) to one or more documents, such as repair and maintenance manuals.

FIG. 2 shows logbook pages being analyzed to determine the associated discrepancy and corrective actions attributes. Each log page contains a unique log page number 209 and aircraft number 211. The discrepancy data will be normalized into observation text and the observation ATA 213 can usually be derived directly from the log page data. In the aircraft industry ATA is short for an AIR TRANSPORT ASSOCIATION code that is hierarchical with a 2-digit code referring to an aircraft system and a 4-digit code referring to a sub-system. For example, engines and there sub-systems are documented in Chapters 71 to 80. Standard repair text is derived from a synthesis process using an index as in known to provide a list that allows corrective actions to be grouped. In many cases where applicable, deferral information for deferred maintenance and associated MEL Doc Ref and part information will also be found in the corrective action text.

Figures 3, 4:
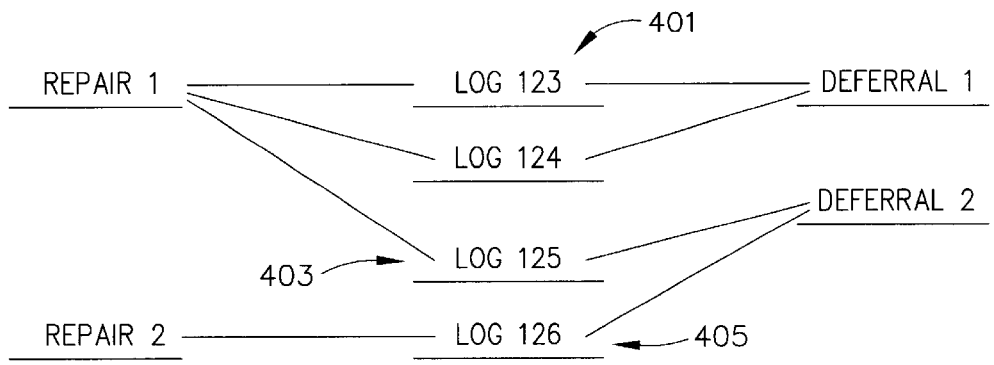
FIG. 3 and FIG. 4 in tabular and graphical form, respectively, illustrates in a simplified and exemplary manner associating deferral procedures and standard repairs using common historical data, according to the instant invention.

A deferral normalization process analyzes the deferral text in the corrective action of the log page to identify the referenced Deferral Procedure 215, if any. This process uses the Deferral Procedure List to identify the format and valid strings for references to Deferral Procedures. The Deferral Procedure List includes any auxiliary formats or aliases that can be used to refer to or identify each Deferral Procedure, such as Deferral 1, etc in the log book pages. The result of this process is shown in tabular form in table 1 of FIG. 3. FIG. 3 indicates a listing of Deferral 301 and corresponding aircraft 303 and the reference to historical data or log page numbers 305. FIG. 3 also shows the associated standard repairs 307 that have been identified from the analysis of the corrective actions on the log pages. The data within the rows of table 3 show each of the plurality of deferral procedures with a corresponding one or more of a plurality of standard repairs each from the standard repair list.

FIG. 4 depicts these relationships or associations between deferral procedures and standard repairs using the common reference to historical data, specifically log page number. As shown Deferral 1 is associated with Repair 1 with two references 401, page number 123 and 124. Deferral 2 is associated with Repair 1 via one reference 403, specifically page number 125 and with Repair 2 via one reference 405, specifically page number 126. As the data set becomes larger, a comprehensive view of the many to many relationships that exist between the plurality of deferral procedures and plurality of standard repairs will become much more complex and arguably more evident.

Figure 5:
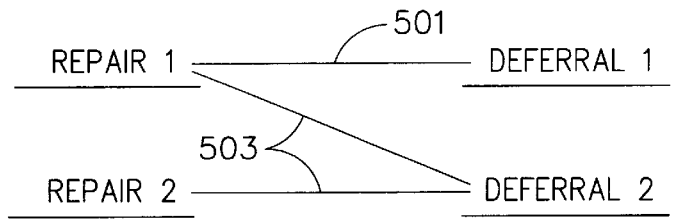
FIG. 5 depicts the associations between deferral procedures and standard repairs.
Figure 6:
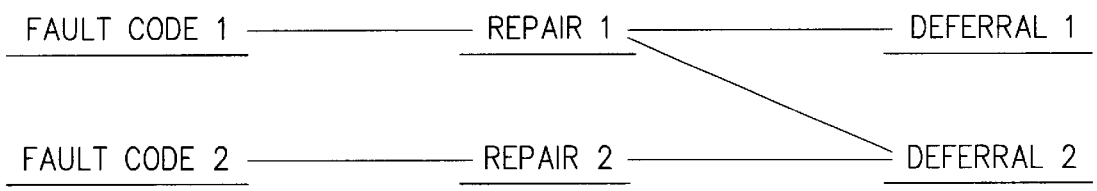
FIG. 6 depicts a diagram of fault codes linked to the standard repairs.
Figure 7:
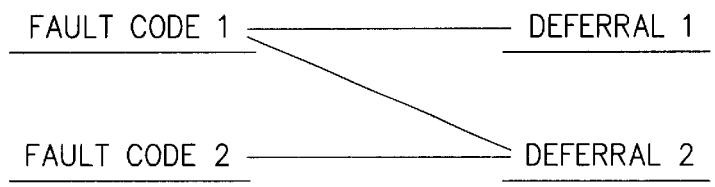
FIG. 7 depicts the final association between fault codes and deferral procedures.

FIG. 5 depicts the associations between deferral procedures and standard repairs after the historical references or log page information and multiple links have been removed. In database language this can be performed using a query to eliminate the log page information and duplicate associations. From FIG. 5 we note that Deferral 1 is associated 501 with Repair 1 and Deferral 2 is associated 503 with Repair 1 and 2. After FIG. 5 the present method uses the Standard Fault Code list, given or produced as noted above to create links between the standard repairs and Fault codes as shown in FIG. 6. For our purposes each standard repair will have a fault code. Thus as FIG. 6 depicts Fault Code 1 is linked to Repair 1 and Fault code 2 is linked to Repair 2. FIG. 7 depicts the final association between fault codes and deferral procedures after removal of the standard repair links or associations. By using the present inventive principles and concepts we have shown a method to develop associations or linkages between fault codes and deferral procedures for an aircraft fault model. Note that in developing the relationships the data generated by this process is initially presented to the user for review and correction. The user interface for this portion of the process provides a listing of the links that the method created with an indication for the user to indicate whether they accept or reject that link. The set of accepted Fault Code to Deferral Links is the final output of the method.

In the nature of a summary on aspect of the disclosed method is a software program comprising software instructions that is arranged to run on a processor to process information derived from historical data in order to facilitate associating deferral procedures to a fault model for complex systems based on the historical data. The software program when installed and operating on a processor results in the processor: analyzing the historical data for deferral information to identify a plurality of deferral procedures; associating each of the plurality of deferral procedures with a corresponding one or more of a plurality of standard repairs; linking each of the plurality of standard repairs with a fault code; and associating each of the plurality of deferral procedures with one or more of the fault codes that were linked, respectively, with the one or more of the plurality of standard repairs to thereby provide a set of associations between the plurality of deferral procedures and a plurality of fault codes.

The step or process of analyzing the historical data for deferral information to identify the plurality of deferral procedures further includes assigning a deferral procedure from a deferral procedure list to each instance of deferral information. Also a reference to the historical data is maintained with each of the plurality of deferral procedures and each of the plurality of standard repairs. Thus the process of associating the plurality of deferral procedures further includes creating relationships between the plurality of deferral procedures and the plurality of standard repairs utilizing the historical data that is common between a deferral procedure and a standard repair. The process of linking the plurality of standard repairs preferably includes selecting the fault code from a standard fault code list. Additionally a process of reviewing and accepting a portion of the set of associations is appropriate, particularly when the complex system is an aircraft and this method is part of or used to enhance part of a fault model for an aircraft.

Another use for the method and the software program above described is as an aircraft maintenance and operations support system for automatically associating deferral procedures with an aircraft fault model based on historical data. This system preferably includes a user interface; a computer having memory for storing software instructions and the historical data and a processor for executing the software instructions to process information derived from the historical data in order to facilitate associating the deferral procedures to the aircraft fault model based on the historical data. Thus the software program will result in the computer following the method noted above. The process of reviewing is facilitated by displaying the set of associations on the monitor to facilitate a user reviewing and accepting a portion of the set of associations.

The processes, discussed above, and the inventive principles thereof are intended to and will alleviate problems, such as inconsistent diagnostics and corrective actions or records thereof caused by prior art maintenance and service procedures for deferral processes. Using these principles of associating deferral procedures and fault codes will simplify service and maintenance procedures and save costs associated with inconsistent activities.

Various embodiments of methods, systems, and apparatus for developing associating or linking deferral procedures and fault models or fault codes so as to facilitate and provide for consistent and cost effective maintenance and service programs for complex systems have been discussed and described. It is expected that these embodiments or others in accordance with the present invention will have application to many complex systems. The disclosed principles and concepts extend to these systems and specifically to methods employed for maintenance and service thereby and therein. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A method of associating deferral procedures to a fault model for complex systems based on historical data, the method including the steps of:

analyzing the historical data for deferral information to identify a plurality of deferral procedures;

associating each of said plurality of deferral procedures with a corresponding one or more of a plurality of standard repairs;

linking each of said plurality of standard repairs with a fault code; and associating each of said plurality of deferral procedures with one or more off said fault codes that were linked, respectively, with said one or more of said plurality of standard repairs to thereby provide a set of associations between said plurality of deferral procedures and a plurality of fault codes.

2. The method of claim 1 wherein said step of analyzing the historical data for deferral information to identify said plurality of deferral procedures further includes assigning a deferral procedure from a deferral procedure list to each deferral information.

3. The method of claim 1 wherein a reference to the historical data is maintained with each of said plurality of deferral procedures and each of said plurality of standard repairs.

4. The method of claim 1 wherein said step of associating said plurality of deferral procedures with a corresponding one or more of a plurality of standard repairs further includes creating relationships between said plurality of deferral procedures and said plurality of standard repairs utilizing the historical data that is common between a deferral procedure and a standard repair.

5. The method of claim 1 wherein said step of linking said plurality of standard repairs includes selecting said fault code from a standard fault code list.

6. The method of claim 1 further including a step of reviewing and accepting a portion of said set of associations.

7. The method of claim 1 used to associate deferral procedures to a fault model for an aircraft.

8. A computer-readable storage medium containing computer executable code to run on a processor to process information derived from historical data in order to facilitate associating deferral procedures to a fault model for complex systems based on the historical data, the computer executable code when installed and operating on a processor, instructing the processor to perform the steps of:

analyzing the historical data for deferral information to identify a plurality of deferral procedures;

associating each of said plurality of deferral procedures with a corresponding one or more of a plurality of standard repairs;

linking each of said plurality of standard repairs with a fault code; and associating each of said plurality of deferral procedures with one or more of said fault codes that were linked, respectively, with said one or more of said plurality of standard repairs to thereby provide a set of associations between said plurality of deferral procedures and a plurality of fault codes.

9. The storage medium of claim 8 wherein said step of analyzing the historical data for deferral information to identify said plurality of deferral procedures further includes assigning a deferral procedure from a deferral procedure list to each deferral information.

10. The storage medium of claim 8 wherein a reference to the historical data is maintained with each of said plurality of deferral procedures and each of said plurality of standard repairs.

11. The storage medium of claim 8 wherein said step of associating said plurality of deferral procedures with a corresponding one or more of a plurality of standard repairs further includes creating relationships between said plurality of deferral procedures and said plurality of standard repairs utilizing the historical data that is common between a deferral procedure and a standard repair.

12. The storage medium of claim 8 wherein said step of linking said plurality of standard repairs includes selecting said fault code from a standard fault code list.

13. The storage medium of claim 8 further including a step of reviewing and accepting a portion of said set of associations.

14. The storage medium of claim 8 used to associate deferral procedures to a fault model for an aircraft.

15. An aircraft maintenance and operations support system for automatically associating deferral procedures with an aircraft fault model based on historical data, the system comprising in combination:

a user interface;

a computer, coupled to the user interface, having memory for storing software instructions and the historical data and a processor for;

executing said software instructions to process information derived from the historical data in order to facilitate associating the deferral procedures to the aircraft fault model based on the historical data, the software program resulting in the computer;

analyzing the historical data for deferral information to identify a plurality of deferral procedures;

associating each of said plurality of deferral procedures with a corresponding one or more of a plurality of standard repairs;

linking each of said plurality of standard repairs with a fault code; and associating each of said plurality of deferral procedures with one or more of said fault codes that were linked, respectively, with said one or more of said plurality of standard repairs to thereby provide a set of associations between said plurality of deferral procedures and a plurality of fault codes.

16. The system of claim 15 wherein said step of analyzing the historical data for deferral information to identify said plurality of deferral procedures further includes assigning a deferral procedure from a deferral procedure list to each deferral information.

17. The system of claim 15 wherein a reference to the historical data is maintained with each of said plurality of deferral procedures and each of said plurality of standard repairs.

18. The system of claim 15 wherein said step of associating said plurality of deferral procedures with a corresponding one or more of a plurality of standard repairs further includes creating relationships between said plurality of deferral procedures and said plurality of standard repairs utilizing the historical data that is common between a deferral procedure and a standard repair.

19. The system of claim 15 wherein said step of linking said plurality of standard repairs includes selecting said fault code from a standard fault code list.

20. The system of claim 15 further including a step of displaying said set of associations on said monitor to facilitate a user reviewing and accepting a portion of said set of associations.

* * * * *